US 8,014,639 B1

(12) United States Patent
Skogen et al.

(10) Patent No.: US 8,014,639 B1
(45) Date of Patent: Sep. 6, 2011

(54) OPTICAL NOR GATE

(76) Inventors: Erik J. Skogen, Albuquerque, NM (US); Anna Tauke-Pedretti, Albuquerque, NM (US)

( * ) Notice: Subject to any disclaimer, the term of this patent is extended or adjusted under 35 U.S.C. 154(b) by 484 days.

(21) Appl. No.: 12/270,221

(22) Filed: Nov. 13, 2008

(51) Int. Cl.
  *G02B 6/12* (2006.01)
  *G02B 6/13* (2006.01)
  *G02F 1/035* (2006.01)
(52) U.S. Cl. .................................. 385/14; 385/2
(58) Field of Classification Search .................. None
  See application file for complete search history.

(56) References Cited

U.S. PATENT DOCUMENTS

| | | | |
|---|---|---|---|
| 5,999,284 A * | 12/1999 | Roberts | 359/108 |
| 6,795,622 B2 * | 9/2004 | Forrest et al. | 385/50 |
| 7,689,081 B2 * | 3/2010 | Covey | 385/122 |
| 7,787,719 B1 * | 8/2010 | Vawter | 385/14 |
| 2003/0007719 A1 * | 1/2003 | Forrest et al. | 385/14 |
| 2005/0069003 A1 * | 3/2005 | DiJaili et al. | 372/38.1 |
| 2009/0154887 A1 * | 6/2009 | Covey | 385/122 |
| 2009/0297094 A1 * | 12/2009 | Hochberg et al. | 385/14 |
| 2010/0097677 A1 * | 4/2010 | Nazarathy et al. | 359/108 |
| 2010/0098373 A1 * | 4/2010 | Hochberg et al. | 385/2 |

OTHER PUBLICATIONS

S. Kodama et al, "2.3 picoseconds optical gate monolithically integrating photodiode and electroabsorption modulator", Electronics Letters, vol. 37, No. 19, Sep. 13, 2001, pp. 1185-1186.

S. Kodama et al, "500 Gbit/s optical gate monolithically integrating photodiode and electroabsorption modulator", Electronics Letters, vol. 40, No. 9, Apr. 29, 2004, pp. 555-556.
David A. B. Miller et al, "The Quantum Well Seif-Electrooptic Effect Device: Optoelectronic Bistability and Oscillation, and Self-Linearized Modulation," IEEE Journal of Quantum Electronics, vol. QE-21, No. 9 Sep. 1985, pp. 1462-1476.
James W. Raring et al, "Design and Demonstration of Novel QW Intermixing Scheme for the Integration of UTC-Type Photodiodes with QW-Based Components", IEEE Journal of Quantum Electronics, Feb. 2006, vol. 42, No. 2, pp. 171-181.
James W. Raring et al, "40-Gb/s Widely Tunable Transceivers", IEEE Journal of Selected Topics in Quantum Electronics, vol. 13, No. 1, Jan.-Feb. 2007, pp. 3-14.
Erik J. Skogen et al, "Monolithically Integrated Active Components: A Quantum-Well Intermixing Approach", IEEE Journal of Selected Topics in Quantum Electronics, vol. 11, No. 2, Mar./Apr. 2005, pp. 343-355.
Toshihide Yoshimatsu et al, "100-Gb/s Error-Free Wavelength Conversion with a Monolithic Optical Gate Integrating a Photodiode and Electroabsorption Modulator", IEEE Photonics Technology Letters, 2005, vol. 17, No. 11 pp. 2367-2369.

* cited by examiner

*Primary Examiner* — Michelle R Connelly Cushwa
(74) *Attorney, Agent, or Firm* — John Hohimer

(57) ABSTRACT

An optical NOR gate is formed from two pair of optical waveguide devices on a substrate, with each pair of the optical waveguide devices consisting of an electroabsorption modulator electrically connected in series with a waveguide photodetector. The optical NOR gate utilizes two digital optical inputs and a continuous light input to provide a NOR function digital optical output. The optical NOR gate can be formed from III-V compound semiconductor layers which are epitaxially deposited on a III-V compound semiconductor substrate, and operates at a wavelength in the range of 0.8-2.0 μm.

20 Claims, 10 Drawing Sheets

| "A" Input | "B" Input | NOR Output |
|---|---|---|
| "0" | "0" | "1" |
| "0" | "1" | "0" |
| "1" | "0" | "0" |
| "1" | "1" | "0" |

FIG. 3

OPTICAL NOR GATE

GOVERNMENT RIGHTS

This invention was made with Government support under Contract No. DE-AC04-94AL85000 awarded by the U.S. Department of Energy. The Government has certain rights in the invention.

CROSS REFERENCE TO RELATED APPLICATIONS

The present application is related to U.S. patent application Ser. No. 12/182,683, entitled "Optical NAND Gate," of common assignee filed on Jul. 30, 2008, the contents of which are incorporated herein by reference in their entirety.

FIELD OF THE INVENTION

The present invention relates in general to digital optical logic gates, and in particular to a optical NOR gate which utilizes electroabsorption modulators and waveguide photodetectors to generate a NOR function digital optical output from a pair of digital optical inputs.

BACKGROUND OF THE INVENTION

Optical logic gates have been the subject of research for several decades due to the possibility of achieving higher operating speeds than logic based on electronics. The advantages of digital signal processing in the optical domain include higher signal bandwidth, lower signal cross-talk, and greater protection against electronic eavesdropping. All-optical signal processing also eliminates the need to convert signals from the optical domain into the electronic domain for processing and then to re-convert the processed signals from the electronic domain back into the optical domain. All-optical signal processing is advantageous to reduce the cost, electrical power requirement, size and weight compared to optical-to-electronic converters, electronic signal processing circuitry, and electronic-to-optical converters which are currently being used.

The present invention addresses the need for optical logic gates by providing an optical NOR gate which can be formed as a photonic integrated circuit (PIC) using two electroabsorption modulator (EAM) photodiode (PD) pairs, with each EAM/PD pair being electrically connected in series. This configuration according to the present invention provides advantages in terms of optical isolation of input and output signals, an ability to be monolithically integrated and an ability to operate using direct-current electrical power sources with a relatively low power consumption and a relatively compact size. The present invention is also advantageous in providing for optical signal gain and regeneration thereby permitting a fan out capability which can allow multiple optical NOR gates to be interconnected together or to be interconnected to the optical NAND gates described in U.S. patent application Ser. No. 12/182,683 to provide a higher level of logic functionality as needed for optical signal processing or optical computing applications.

These and other advantages of the present invention will become evident to those skilled in the art.

SUMMARY OF THE INVENTION

The present invention relates to a photonic integrated circuit (PIC) which generates a NOR function digital optical output (also referred to herein as a NOR function output or a NOR output) from a pair of digital optical inputs. The PIC comprises a first pair of optical waveguide devices formed on a substrate, with the first pair of optical waveguide devices comprising a first electroabsorption modulator which is electrically connected in series with a first photodetector, and a second pair of optical waveguide devices formed on the substrate, with the second pair of optical waveguide devices comprising a second electroabsorption modulator which is electrically connected in series with a second photodetector. The first electroabsorption modulator receives an input of continuous light; and the first photodetector receives a first digital optical input of the pair of digital optical inputs and generates therefrom a photocurrent signal which changes a reverse-bias voltage on the first electroabsorption modulator to generate a digitally-modulated output from the input of continuous light. The second electroabsorption modulator receives the digitally-modulated output from the first electroabsorption modulator; and the second photodetector receives a second digital optical input of the pair of digital optical inputs and uses the second digital optical input to generate another photocurrent signal which changes the reverse bias voltage on the second electroabsorption modulator to convert the digitally-modulated output into the NOR function digital optical output.

The input of continuous light can be provided by a laser which can be located on the substrate. The laser can comprise a distributed-Bragg reflector (DBR) laser. The laser can operate in a wavelength range of 0.8-2.0 microns, with the pair of digital optical inputs also being in this same wavelength range.

A plurality of optical waveguides can be provided on the substrate to guide the input of continuous light to the first electroabsorption modulator, to guide the first digital optical input to the first photodetector, to guide the digitally-modulated output from the first electroabsorption modulator to the second electroabsorption modulator, to guide the second digital optical input to the second photodetector, and to guide the NOR function digital optical output from the second electroabsorption modulator.

The substrate can comprise a III-V compound semiconductor substrate. Each electroabsorption modulator and each photodetector can comprise a plurality of III-V compound semiconductor layers which are epitaxially grown on the III-V compound semiconductor substrate.

In certain embodiments of the present invention, the III-V compound semiconductor substrate can comprise indium phosphide (InP); and the plurality of III-V compound semiconductor layers can be selected from the group consisting of indium gallium arsenide phosphide (InGaAsP) layers, indium gallium arsenide (InGaAs) layers, indium aluminum gallium arsenide (InAlGaAs) layers, and combinations thereof. In other embodiments of the present invention, the III-V compound semiconductor substrate can comprise gallium arsenide (GaAs); and the plurality of III-V compound semiconductor layers can be selected from the group consisting of GaAs layers, aluminum gallium arsenide (AlGaAs) layers, InGaAsP layers, InGaAs layers, and combinations thereof.

One or more semiconductor optical amplifiers (SOAs) can be optionally formed on the substrate to amplify one or more optical signals selected from the group consisting of the input of continuous light, the first digital optical input, the second digital optical input, the digitally-modulated output from the first electroabsorption modulator, and the NOR function digital optical output.

The present invention also relates to an optical NOR gate which receives a first digital optical input and a second digital optical input and generates therefrom a NOR function digital optical output. The optical NOR gate comprises a III-V compound semiconductor substrate having a plurality of III-V compound semiconductor layers epitaxially grown thereon; a laser formed from the plurality of III-V compound semiconductor layers to provide a source of continuous light; a first electroabsorption modulator formed from the plurality of III-V compound semiconductor layers, with the first electroabsorption modulator receiving the continuous light from the laser; a first waveguide photodetector formed from the plurality of III-V compound semiconductor layers to receive the first digital optical input and to generate therefrom a first photocurrent signal which changes an absorption of light in the first electroabsorption modulator, thereby modulating the continuous light transmitted through the first electroabsorption modulator to provide a digitally-modulated output from the first electroabsorption modulator; a second electroabsorption modulator formed from the plurality of III-V compound semiconductor layers, with the second electroabsorption modulator receiving the digitally-modulated output from the first electroabsorption modulator; and a second waveguide photodetector formed from the plurality of III-V compound semiconductor layers to receive the second digital optical input and to generate therefrom a second photocurrent signal which changes the absorption of light in the second electroabsorption modulator, thereby converting the digitally-modulated output being transmitted through the second electroabsorption modulator into the NOR function digital optical output.

The first digital optical input and the second digital optical input can have a wavelength in the range of 0.8-2.0 microns; and the continuous light from the laser can also have a wavelength in the range of 0.8-2.0 microns. The wavelengths of the first and second digital optical inputs can be the same or different; and the wavelength of the continuous light from the laser can also be the same or different from one or both of the first and second digital optical inputs.

In some embodiments of the present invention, the III-V compound semiconductor substrate can comprise indium phosphide (InP); and the plurality of III-V compound semiconductor layers can be selected from the group consisting of indium gallium arsenide phosphide (InGaAsP) layers, indium gallium arsenide (InGaAs) layers, indium aluminum gallium arsenide (InAlGaAs) layers, and combinations thereof. In other embodiments of the present invention, the III-V compound semiconductor substrate can comprise gallium arsenide (GaAs); and the plurality of III-V compound semiconductor layers can be selected from the group consisting of GaAs layers, aluminum gallium arsenide (AlGaAs) layers, InGaAsP layers, InGaAs layers, and combinations thereof. A plurality of passive optical waveguides can be provided on the substrate and formed from the plurality of III-V compound semiconductor layers. These passive optical waveguides can be used to guide continuous light from the laser to the first electroabsorption modulator, to guide the first digital optical input to the first waveguide photodetector, to guide the second digital optical input to the second waveguide photodetector, to guide the digitally-modulated output from the first electroabsorption modulator to the second electroabsorption modulator, and to guide the NOR function digital optical output from the second electroabsorption modulator.

The first electroabsorption modulator and the first waveguide photodetector are electrically connected in series; and the second electroabsorption modulator and the second waveguide photodetector are also electrically connected in series. The laser can comprise a distributed Bragg reflector (DBR) laser.

One or more semiconductor optical amplifiers can be optionally formed on the III-V compound semiconductor substrate from the plurality of III-V compound semiconductor layers to amplify one or more optical signals. These optical signals can be selected from the group consisting of the continuous light from the laser, the first digital optical input, the second digital optical input, the digitally-modulated output from the first electroabsorption modulator, and the NOR function digital optical output.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings:

FIG. 3 shows a logical truth table for the optical NOR gate of FIG. 1.

FIGS. 4A-4G are taken along the section line 1-1 in FIG. 1; and FIG. 4H is taken along the section line 2-2 in FIG. 1.

DETAILED DESCRIPTION OF THE INVENTION

Figure 1:
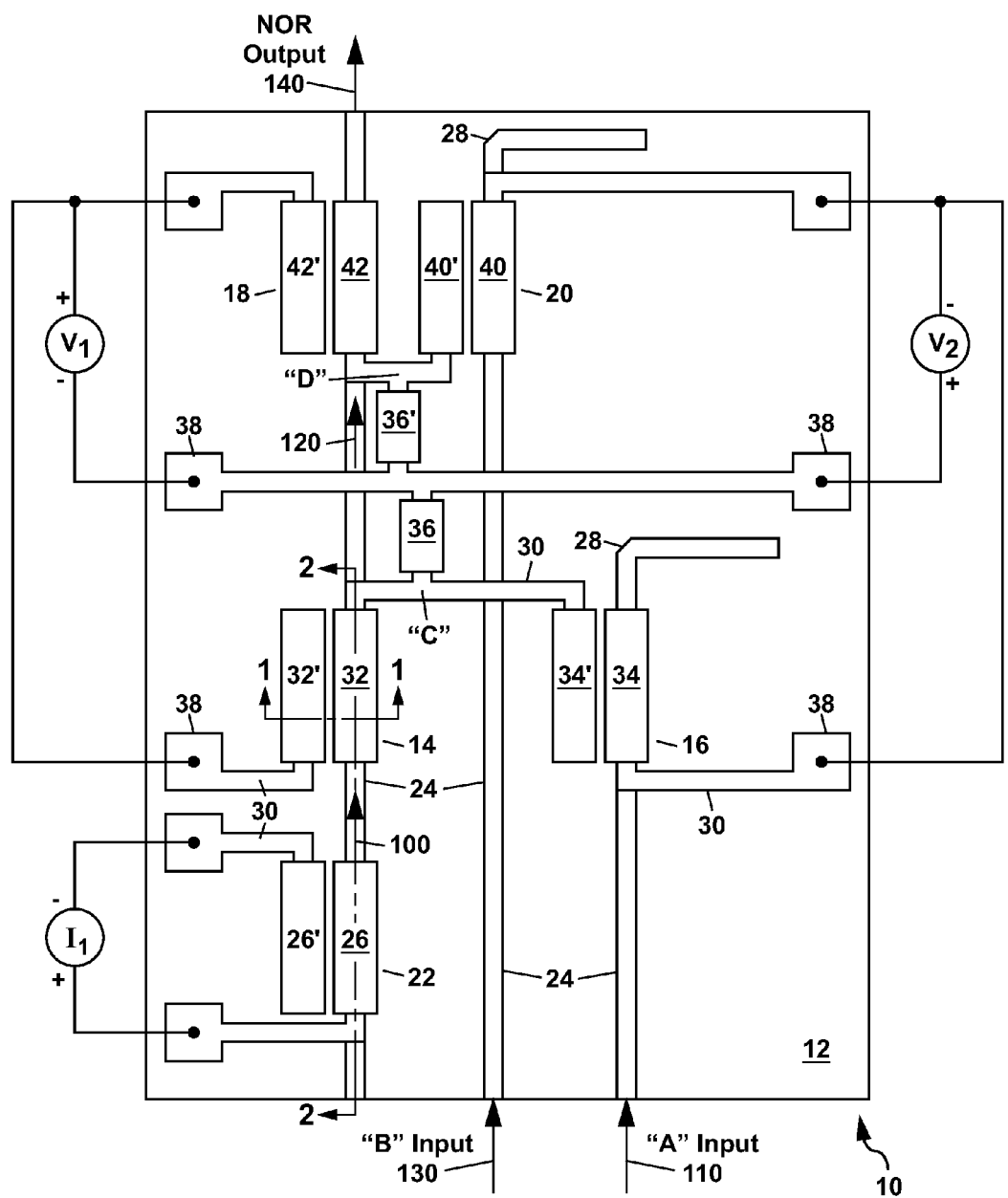
FIG. 1 shows a schematic plan view of a first example of the optical NOR gate of the present invention.
Figure 2:
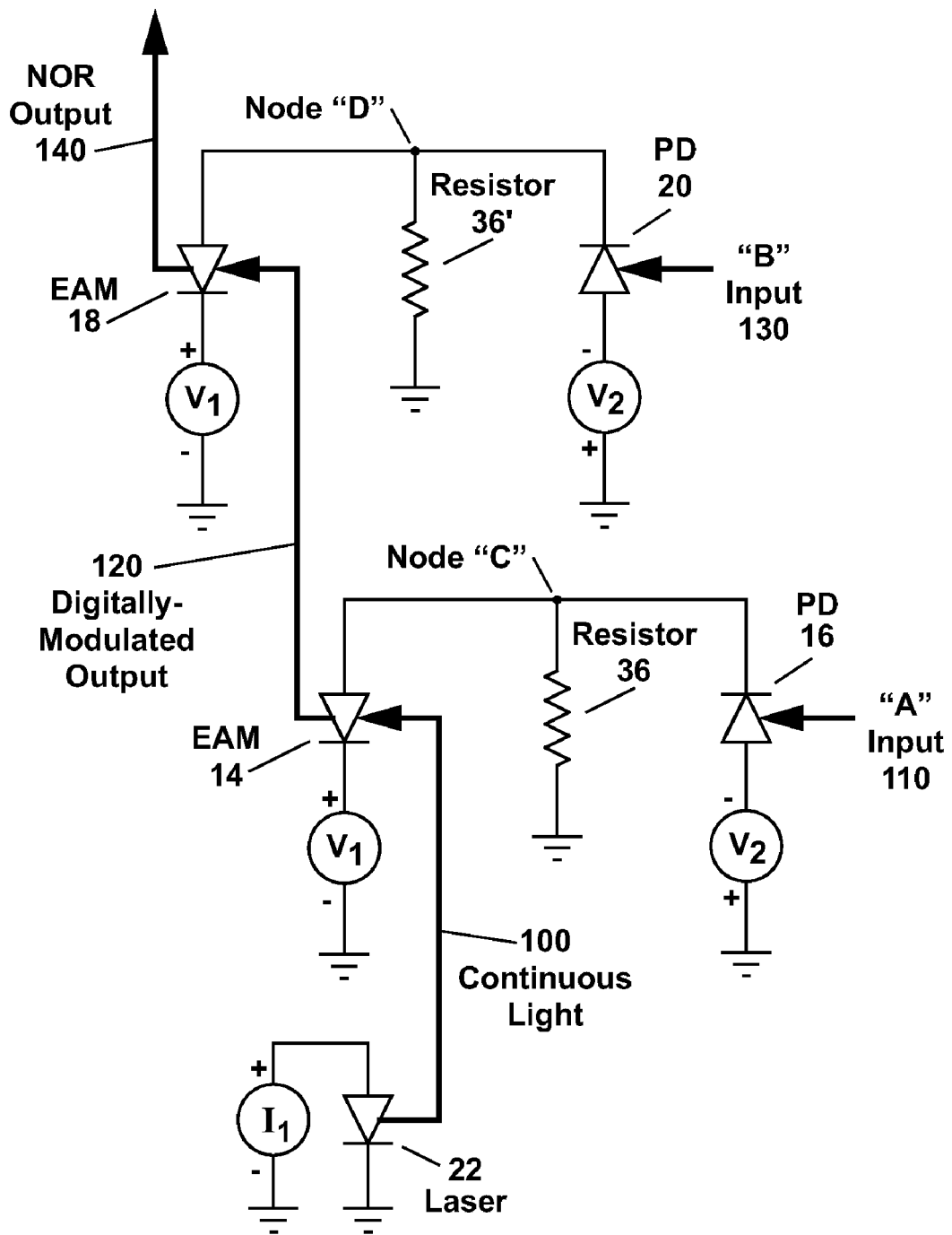
FIG. 2 shows a schematic diagram of the electrical and optical circuit for the optical NOR gate of FIG. 1.

Referring to FIG. 1, there is shown a schematic plan view of a first example of the optical NOR gate 10 of the present invention which can be formed as a photonic integrated circuit (PIC). FIG. 2 shows a schematic diagram of the electrical and optical circuit for the optical NOR gate 10 of FIG. 1.

The optical NOR gate 10 comprises a substrate 12 on which are formed a first electroabsorption modulator (EAM) 14 and a first waveguide photodetector (PD) 16 which are electrically connected together in series with a cathode side of the PD 16 being connected to an anode side of the EAM 16 as shown in FIG. 2. A second EAM 18 and a second waveguide PD 20 are also provided on the substrate 12 and are electrically connected together in series with the cathode side of the PD 20 being connected to the anode side of the EAM 18 as shown in FIG. 2. Each electroabsorption modulator and waveguide photodetector described herein can be formed either as a lumped-element device, or as a traveling-wave device.

In FIGS. 1 and 2, the first electroabsorption modulator 14 receives an input 100 of continuous light (i.e. continuous lasing emission) which can be generated by a laser 22 located on the substrate 12. The continuous light input 100 is directed through a passive optical waveguide 24 on the substrate 12 to the first electroabsorption modulator 14.

The laser 22 can be a distributed Bragg reflector (DBR) laser 22 which is located on the substrate 12 as shown in FIG. 1 with a plurality of electrodes, including an upper electrode 26 and a lower electrode 26'. The DBR laser 22 can be forward-biased with a current source $I_1$ to generate the continuous light 100 which is due to continuous-wave (cw) lasing emission. The continuous light 100 from the DBR laser 22 can have an optical power in the range of 3-10 milliWatts (mW) or more. In other embodiments of the present invention, the continuous light 100 can be provided by a laser 22 which is located off the substrate 12 (see FIG. 5) and coupled into the passive waveguide 24 on the substrate 12 using either free-space or optical fiber coupling.

The first waveguide photodetector 16 receives a first digital optical input 110, which is denoted as the "A" input. The "A" input 110 can be provided, for example, from an optical fiber and can comprise a stream of digital optical data. The "A" input 110 is transmitted through another passive optical waveguide 24 (also referred to herein as an optical waveguide 24) on the substrate 12 and is directed into the first waveguide photodetector 16 where the "A" input 110 is absorbed to generate a photocurrent signal which can be used to modulate an absorption of the continuous light input 100 being transmitted through the first electroabsorption modulator 14, thereby producing a digitally-modulated output 120 from the first electroabsorption modulator 14.

The second waveguide photodetector 20 in FIGS. 1 and 2 receives a second digital optical input 130, which is denoted as the "B" input, with the "B" input 130 being directed to the second waveguide photodetector 20 using yet another optical waveguide 24. The "B" input 130 is absorbed within the second waveguide photodetector 20 to generate another photocurrent signal which is then used to modulate the absorption of the second electroabsorption modulator 18, thereby converting the digitally-modulated output 120 being transmitted through the modulator 18 to form a NOR function digital optical output 140 from the second electroabsorption modulator 18.

Since the "A" and "B" inputs 110 and 130, respectively, are digital signals, then the photocurrent signal generated by each photodetector 16 and 20 will also generally be digital signals depending upon a data rate for operation of the device 10 which can be up to 100 gigaHertz (GHz) or more. Any of the "A" and "B" inputs 110, 130 which are not absorbed in the photodetectors 16, 20 to generate the photocurrent signals are coupled into L-shaped passive waveguides 28 which serve as optical traps.

The first electroabsorption modulator 14 and the first waveguide photodetector 16 are electrically connected in series by wiring 30 formed on the substrate 12. The wiring 30, which can be in the form of a radio-frequency (rf) transmission line, connects an upper electrode 32 of the first electroabsorption modulator 14 to an lower electrode 34' of the first waveguide photodetector 16 to connect these two elements 14 and 16 in series. This same wiring 30 is connected through a resistor 36 (e.g. a 20-50 Ohm resistor) to an electrical ground connection which is in common with a first bias voltage $V_1$ which is used to reverse-bias the first electroabsorption modulator 14 and which is also in common with a second bias voltage $V_2$ which is used to reverse-bias the first waveguide photodetector 16. Additional wiring 30 is used to connect a lower electrode 32' of the first electroabsorption modulator 14 to the bias voltage $V_1$, and to connect an upper electrode 34 of the first waveguide photodetector 16 to the bias voltage $V_2$. The first bias voltage $V_1$ can be, for example, −1 Volt; and the second bias voltage $V_2$ can be, for example, −5 Volts. The bias voltages $V_1$ and $V_2$ can be supplied by direct-current (dc) power supplies which can be located off of the substrate 12 as shown in FIG. 1 and connected to the wiring 30 using bond pads 38 on the substrate 12.

In the example of FIG. 1, the same bias voltages $V_1$ and $V_2$ are used for the two EAM/PD pairs (i.e. modulator 14 and photodetector 16, and modulator 18 and photodetector 20). In other embodiments of the present invention, separate voltage sources can be used to bias each modulator 14, 18 and each photodetector 16, 20 to provide an independent control over the bias for these elements 14, 16, 18 and 20.

By design, the photocurrent signal generated by the first waveguide photodetector 16 in response to incident light (i.e. the "A" input 110) is relatively independent of an electric field produced therein by the applied reverse-bias voltage $V_2$ and depends only upon the intensity of the incident light. This is also the case for the second waveguide photodetector 20.

On the other hand, the absorption within the first electroabsorption modulator 14 depends upon the electric field produced therein by the applied reverse-bias voltage $V_1$ and any portion of the bias voltage $V_2$ which is dropped across the modulator 14 as a result of the photocurrent generated by the first waveguide photodetector 16. As the amount of the reverse-bias voltage dropped across the electroabsorption modulator 14 increases in response to the photocurrent from the photodetector 16, the absorption of light in the first electroabsorption modulator 14 will increase either due to a Franz-Keldysh effect, or due to a quantum-confined Stark effect. This is also the case for the second electroabsorption modulator 18 with an absorption that is dependent on the photocurrent generated by the second waveguide photodetector 20 as will be described hereinafter. The circuit arrangement of FIG. 1, which allows the two reverse-bias voltages $V_1$ and $V_2$ to be added together to change the reverse-bias voltage dropped across the first electroabsorption modulator 14 in an amount which depends upon the photocurrent produced by the first waveguide photodetector 16, reduces the optical power required for the continuous light input 100 from the laser 22 as compared with the use of a single reverse-bias voltage and also provides for high-speed operation of the optical NOR gate 10.

In the absence of any light input into the first waveguide photodetector 16 due to the "A" input 110 being in a logical "0" state, no photocurrent signal will be generated from the photodetector 16 so that a node "C" where the photodetector 16, modulator 14 and resistor 36 are all connected together (see FIGS. 1 and 2) will be at about ground electrical potential. This drops the entire reverse-bias voltage $V_1$ (e.g. −1 Volt) across the first electroabsorption modulator 14. Since $V_1$ is relatively small, a relatively small absorption of the continuous light input 100 from the laser 22 will be produced within the modulator 14 so that substantially all of the continuous light input 100 will be transmitted through the modulator 14 to provide a relatively high light level for the digitally-modulated output 120 from the first electroabsorption modulator 14, with the digitally-modulated output 120 being in a logical "1" state.

Conversely, when the "A" input 110 is in a logical "1" state corresponding to a relatively high light level, the absorption of the "A" input 110 in the first waveguide photodetector 14 will generate a relatively large photocurrent. This photocurrent will flow through the resistor 36 thereby producing a relatively large change in the electrical potential at node "C" due to the reverse-bias voltage $V_2$ (e.g. −5 Volts) being much larger than $V_1$ (e.g. −1 Volt). The change in the electrical potential at node "C" will add to $V_1$ to increase an overall amount of reverse-bias voltage which is dropped across the first electroabsorption modulator 14 from about one Volt, for example, to several Volts. This increase in the overall amount of the reverse-bias voltage dropped across the first electroabsorption modulator 14 will greatly increase the absorption of the continuous light 100 therein so that very little, if any, of the continuous light 100 will be transmitted through the modulator 14, thereby providing a very low light level for the digitally-modulated output 120 corresponding to the logical "0" state.

The digitally-modulated output 120 is transmitted through the optical waveguide 24 to the second electroabsorption modulator 18 which is connected in series to the second waveguide photodetector 20 and to another resistor 36' (e.g. a 20-50 Ohm resistor) at a node "D" as shown in FIGS. 1 and 2, with the other end of this resistor 36' being electrically grounded. The first bias voltage $V_1$ can be used to reverse bias the second electroabsorption modulator 18; and the second bias voltage $V_2$ can be used to reverse bias the second waveguide photodetector 20.

The "B" input 130 is coupled through one of the passive optical waveguides 24 to the second waveguide photodetector 20 and is used to control the operation of the second electroabsorption modulator 18 in the same way that the first electroabsorption modulator 14 is controlled by the photocurrent generated by the first waveguide photodetector 16. The second waveguide photodetector 20 includes an upper electrode 40 and a lower electrode 40' as shown in FIG. 1; and the second electroabsorption modulator 18 includes an upper electrode 42 and a lower electrode 42'.

When the "B" input 130 is in the logical "0" state, no photocurrent signal will be generated from the second waveguide photodetector 20 so that node "D" will be at about ground electrical potential and the entire reverse-bias voltage $V_1$ dropped across the second electroabsorption modulator 18. Since $V_1$ is relatively small as previously discussed, there will be a relatively small absorption of the digitally-modulated output 120 within the second electroabsorption modulator 18 so that the NOR output 140 will be substantially equal to the digitally-modulated output 120 (i.e. when the digitally-modulated output 120 is in the "0" state, the NOR output 140 will be in the "0" state; and when the digitally-modulated output 120 is in the "1" state, the NOR output 140 will be in the "1" state).

Figure 3:
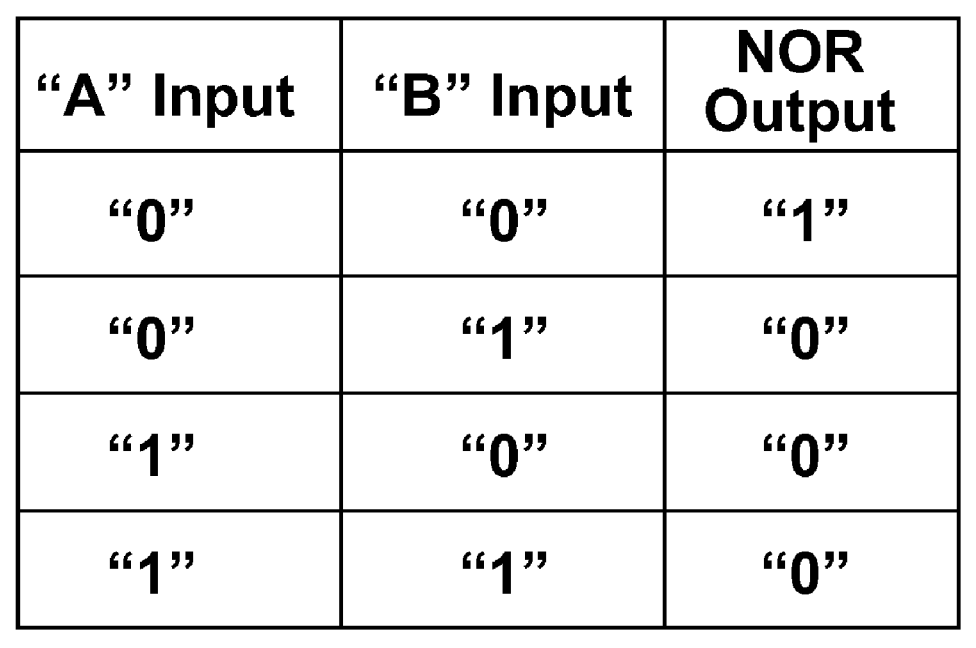

When the "B" input 130 is in the logical "1" state, a relatively large photocurrent will be generated in the second waveguide photodetector 20 and will flow through the resistor 36'. This will increase the electrical potential at the node "D" due to the higher reverse-bias voltage $V_2$ (e.g. −5 Volts); and will also add to $V_1$ to increase the overall amount of reverse-bias voltage being dropped across the second electroabsorption modulator 14, thereby greatly-increasing the absorption of light therein. Thus, the NOR output 140 will be switched to a relatively low level corresponding to the logical "0" state regardless of the logic state of the digitally-modulated output 120 which is input into the second electroabsorption modulator 18. A logical truth table for the optical NOR gate 10 is shown in FIG. 3.

Fabrication of the optical NOR gate 10 of FIG. 1 will now be described with reference to FIGS. 4A-4G which show a series of schematic cross-section views of the device 10 along the section line 1-1 in FIG. 1 during various steps in the fabrication of the optical NOR gate 10, and with reference to FIG. 4H which shows a schematic cross-section view along the section line 2-2 in FIG. 1. Fabrication of the optical NOR gate 10 of FIG. 1 will be described using a quantum-well intermixing process using a plurality of III-V compound semiconductor layers which are epitaxially grown on the substrate 12 which is also preferably a III-V compound semiconductor substrate (e.g. comprising indium phosphide or gallium arsenide). The quantum-well intermixing process allows the fabrication of many different photonic integrated circuit (PIC) elements to be formed on the same substrate 12 in a manner similar to that of semiconductor integrated circuit (IC) fabrication, while allowing the various elements, which can include passive optical waveguides, waveguide photodetectors, waveguide electroabsorption modulators, lasers, and semiconductor optical amplifiers, to be individually optimized.

Those skilled in the art will understand that the optical NOR gate 10 of the present invention can also be fabricated using other types of III-V compound semiconductor fabrication methods which are well-known in the art. These other types of III-V compound semiconductor fabrication methods include butt-joint regrowth, selective area growth, and the use of offset quantum wells and are detailed in the following articles which are incorporated herein by reference: E. Skogen et al., "Monolithically Integrated Active Components: A Quantum-Well Intermixing Approach," *IEEE Journal of Selected Topics in Quantum Electronics*, vol. 11, pp. 343-355, March/April 2005; J. W. Raring et al., "40-Gb/s Widely Tunable Transceivers," *IEEE Journal of Selected Topics in Quantum Electronics*, vol. 13, pp. 3-14, January/February 2007.

Figure 4A:
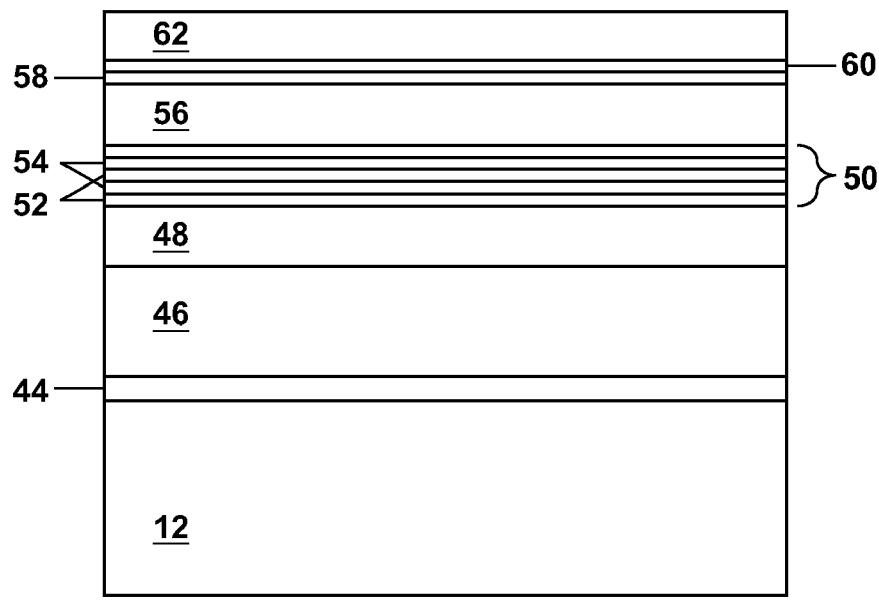
FIGS. 4A-4H show schematic cross-section views along the section lines 1-1 and 2-2 in FIG. 1 to illustrate a series of process steps in the fabrication of the optical NOR gate of FIG. 1.
Figure 4B:
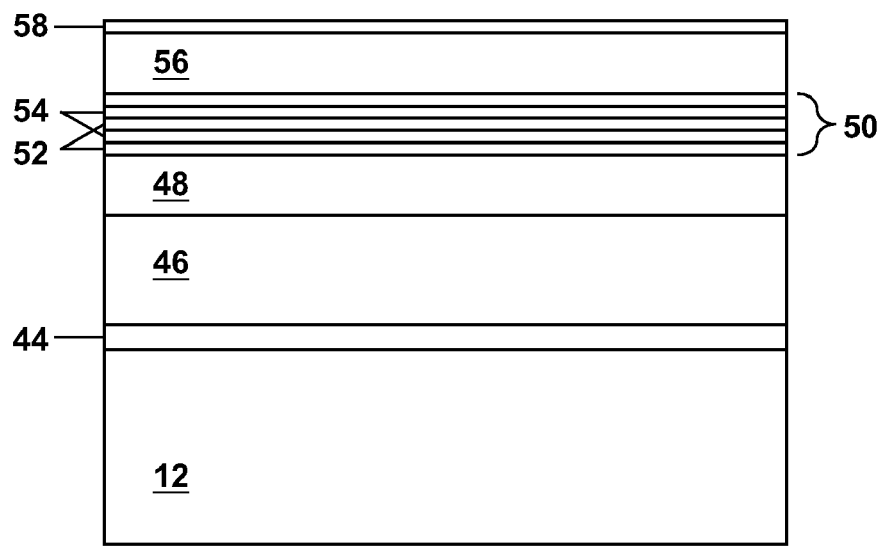

FIG. 4A shows a schematic cross-section view of the plurality of III-V compound semiconductor layers which can be initially epitaxially grown on the substrate 12 in preparation for fabricating the optical NOR gate 10 of the present invention. The III-V compound semiconductor layers can comprise, for example, indium phosphide (InP), indium gallium arsenide phosphide (InGaAsP), indium gallium arsenide (InGaAs), indium aluminum gallium arsenide (InAlGaAs) layers and combinations thereof when the substrate 12 comprises InP. Alternately, the III-V compound semiconductor layers can comprise gallium arsenide (GaAs), aluminum gallium arsenide (AlGaAs), InGaAsP, InGaAs, and combinations thereof when the substrate 12 comprises GaAs. The following discussion will describe fabrication of the optical NOR gate 10 using an InP substrate 12 with InP, InGaAsP and InGaAs layers thereon, but those skilled in the art will understand that the various process steps described hereinafter can be applied with minor modifications to an optical NOR gate 10 formed on a GaAs substrate 12 with a combination of GaAs, AlGaAs, InGaAsP, and InGaAs layers thereon. Those skilled in the art will also understand that other III-V compound semiconductor materials can be used for the substrate 12 and layers epitaxially grown thereon.

In FIG. 4A, the substrate 12 can comprise a semi-insulating Fe-doped InP substrate 12. A plurality of III-V compound semiconductor layers are epitaxially grown on the Fe-doped InP substrate 12 by metal-organic chemical vapor deposition (MOCVD). These III-V compound semiconductor layers are in order of epitaxial growth: an InP buffer layer (not shown), an n-type InGaAs lower contact layer 44; a lower cladding layer 46 of n-type-doped InP which can be 1-2 µm thick; a lower waveguide layer 48 of InGaAsP which is undoped (i.e. not intentionally doped) and about 0.11 µm thick with a composition selected to provide an energy bandgap wavelength $\lambda_g$=1.3 µm; an undoped MQW region 50 which is about 0.11 µm thick and comprises a plurality of alternating quantum well (QW) layers 52 and barrier layers 54 of InGaAsP, with the quantum well layers 52 being about 6.5 nanometers (nm) thick and having an energy bandgap wavelength $\lambda_g$ of, for example, 1.55 µm as measured by photoluminescence, and with the barrier layers 54 being about 8 nm thick and having an energy bandgap wavelength $\lambda_g$=1.3 µm; a upper waveguide layer 56 of undoped InGaAsP about 0.11 µm thick with $A_g$=1.3 µm; an undoped InP etch stop layer 58 about 15 nm thick; an undoped InGaAsP etch stop layer 60 about 20 nm thick with $A_g$=1.3 µm; and an undoped InP implant buffer layer 62 about 0.45 µm thick. As an example, the QW layers 52 can have the semiconductor alloy composition $In_xGa_{1-x}As_yP_{1-y}$ with x=0.735 and y=0.840 to provide the energy bandgap wavelength $\lambda_g$=1.55 µm; and the barrier layers 54 can be formed of $In_xGa_{1-x}As_yP_{1-y}$ with x=0.735 and y=0.513. Those skilled in the art will understand that the exact composition of the layers 52 and 54 in the MQW region 50 and the compositions of the other III-V compound semiconductor layers can be adjusted as needed to provide predetermined values for energy bandgaps of these layers, with the energy bandgap wavelength $\lambda_g$ of the QW layers 52 generally being in the range of 0.8-2.0 µm.

An ion implant mask (e.g. comprising silicon nitride about 0.5 µm thick) can then be provided over the substrate 12 and III-V compound semiconductor layers with openings at locations wherein phosphorous ions are to be implanted into the InP implant buffer layer 62 for use in selectively disordering the MQW region 50. The locations where the waveguide photodetectors 16 and 20 and a gain region of the laser 22 are to be formed will generally not have a disordered MQW region 50 since the MQW region 50 is epitaxially grown to optimize the performance of the photodetectors 16 and 20 and the gain region of the laser 22. The phosphorous ions can be implanted into the InP implant buffer layer 62 at an ion energy of about 100 keV and a dose of about $5 \times 10^{14}$ cm$^{-2}$ with the substrate 12 being at a temperature of about 200° C. The implanted phosphorous ions produce point defects in the InP implant buffer layer 62.

A rapid thermal annealing step can then be used to drive the point defects down into the MQW region 50 to intermix the QW layers 52 and the barrier layers 54 at the interfaces therebetween. This intermixing produces a blue-shift the energy bandgap wavelength in the MQW region 50. The rapid thermal annealing step can be performed at a temperature in the range of 630-700° C. and can be timed for a time interval from about one-half minute up to a few tens of minutes to provide a predetermined energy bandgap wavelength for the MQW region 50 which will depend upon the exact elements of the optical NOR gate 10 being formed. To form the electroabsorption modulators 14 and 18, a first rapid thermal annealing step can be used to provide a few tens of nanometer blue-shift in the energy bandgap wavelength of the MQW region 50 (e.g. to $\mu_g$~1.50 µm) to reduce an absorption loss therein in the absence of any reverse-bias voltage. This same blue-shift is provided for the MQW region 50 for the passive waveguides 24 and for distributed Bragg reflector (DBR) mirror regions which are used to form an optical cavity for the DBR laser 22 and for the gain region and an optional phase control region located within the optical cavity of the DBR laser 22. An additional blue-shift will be provided in a subsequent thermal annealing step for the passive waveguides 24 and the DBR mirror regions to further increase the blue-shift therein (e.g. to $\lambda_g$~1.43 µm) and thereby further reduce the absorption for these elements of the optical NOR gate 10. The blue-shift in the energy bandgap wavelength of the MQW region 50 can be determined using a laser-excited photoluminescence spectroscopy measurement at room-temperature.

After the first rapid thermal annealing step, the InP implant buffer layer 62 can be removed above the electroabsorption modulators 14 and 18 while leaving the layer 62 in place over the passive waveguides 24 and DBR mirror regions. This can be done using a wet etching step to etch away the layer 62, with the wet etching being terminated upon reaching the InGaAsP etch stop layer 60. Removal of the InP implant buffer layer 62 above the electroabsorption modulators 14 and 18 prevents any further blue-shift in the MQW region 50 at these locations since it removes the source of point defects necessary for quantum-well intermixing.

A second rapid thermal annealing step can then be performed at about the same temperature for up to a few minutes (e.g. 2-3 minutes) to provide further intermixing of the QW and barrier layers 52 and 54 to produce an additional few tens of nanometers blue-shift the energy bandgap of the MQW region 50 in the remaining regions where the InP implant buffer layer 62 is still present. This additional blue-shift in the energy bandgap of the MQW region 50 further reduces the absorption loss in the passive waveguides 24 and the DBR mirror regions of the laser 22 in the optical NOR gate 10.

After the second rapid thermal annealing step is performed, the remaining InP implant buffer layer 62 and the InGaAsP etch stop layer 60 can be completely removed from the substrate 12 by wet etching. This is schematically illustrated in the cross-section view of FIG. 4B. Another etching step can then be used to etch a corrugated grating structure down partway into the upper waveguide layer 56 to form a DBR mirror at each end of the DBR laser 22. A rear DBR mirror for the DBR laser 22 can be formed with a length of, for example, 200 µm, and a front DBR mirror in the DBR laser 22 can have a length of, for example, 10-50 µm long. The gain region of the DBR laser 22 can have a length of, for example, 200-500 µm. When a separately-contacted phase control section is to be provided in the DBR laser 22 to provide for tuning of the wavelength of the continuous light 100, the phase control section can have a length of, for example, 75 µm and can be connected through wiring 30 on the substrate 12 to a separate bond pad 38 (not shown in FIG. 1).

Figure 4C:
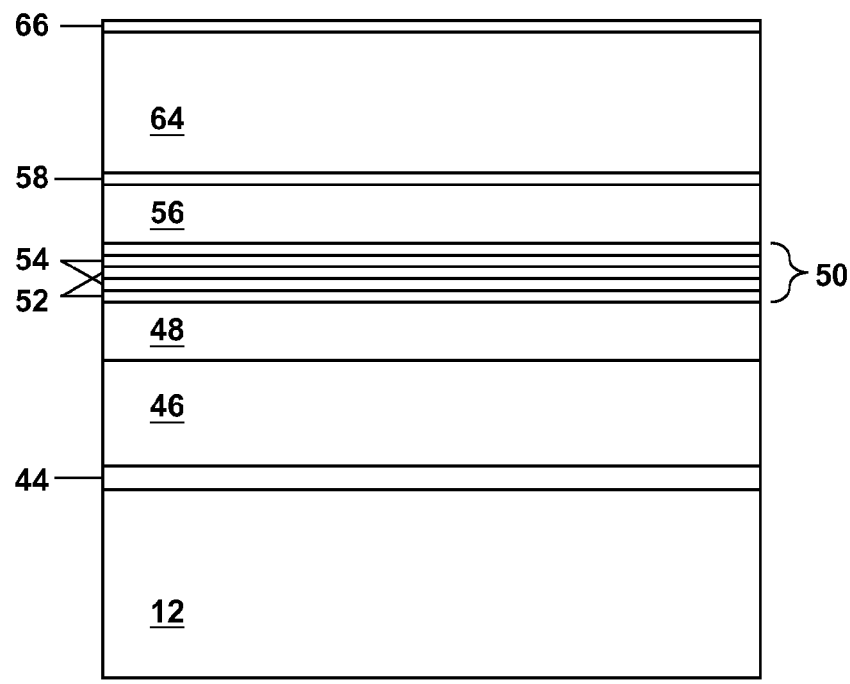

A blanket MOCVD regrowth can then be performed to epitaxially grow an upper cladding layer 64 of p-type-doped InP which can be, for example, 2.35 µm thick followed by a cap layer 66 of p-type-doped InGaAs about 0.2 µm thick. This is shown in FIG. 4C. The p-type-doped InP upper cladding layer 64 in combination with the n-type-doped lower cladding layer 46 form a semiconductor p-i-n junction about the MQW region 50 and waveguide layers 48 and 56 which are undoped (i.e. intrinsic). This semiconductor p-i-n junction is used for electrically-activated elements in the optical NOR gate 10 including the waveguide photodetectors 16 and 20, the electroabsorption modulators 14 and 18 and the gain region of the laser 22 and any semiconductor optical amplifiers (if used).

In other embodiments of the present invention, an offset quantum-well region can be epitaxially grown above the upper waveguide layer 56. This can be useful to form the photodetectors 16 and 20 as uni-traveling carrier photodetectors, and can also be useful to form semiconductor optical amplifiers (SOAs). The use of an offset quantum-well region provides a lower confinement factor than the quantum-well region 50 and thus can increase the saturation power level for the photodetectors 16 and 20 and any SOAs and also allow operation at higher frequencies. Further details of the fabrication of photodetectors and SOAs using offset quantum-well region can be found in an article by J. W. Raring et al., "Design and Demonstration of Novel QW Intermixing Scheme for the Integration of UTC-Type Photodiodes with QW-Based Components," IEEE Journal of Quantum Electronics, vol. 42, pp. 171-181, February 2006, which is incorporated herein by reference.

Figure 4D:
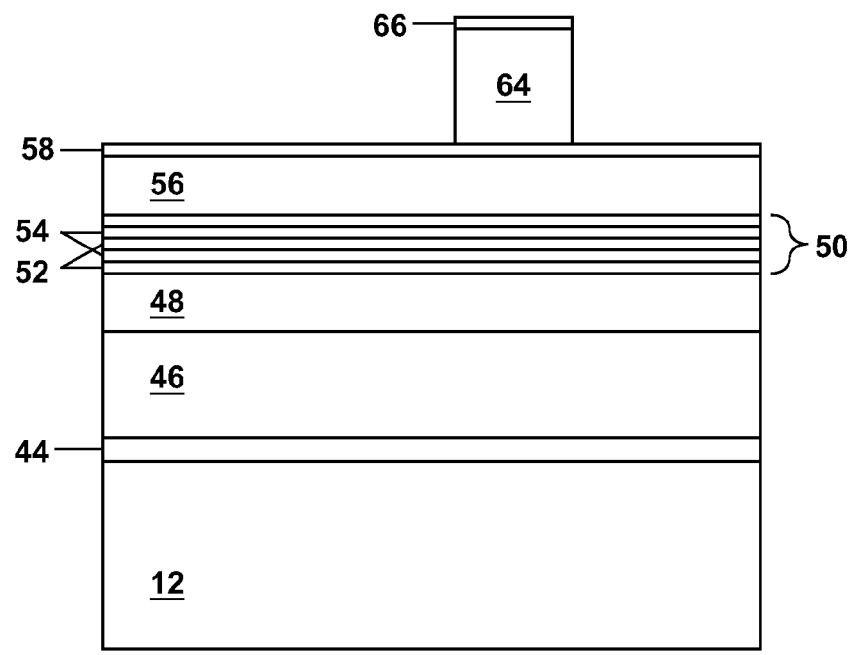

An etch mask (not shown) can be provided over the substrate 12 and photolithographically patterned for use in etching down through the InGaAs cap layer 66 and the InP upper cladding layer 64 as shown in FIG. 4D. This defines an effective waveguide width of the various elements 14, 16, 18, 20, 22 and 24 which can be, for example, up to a few microns or more (e.g. 1-3 µm for the waveguides 24, modulators 14 and 18 and laser 22; and 1-10 µm wide for the photodetectors 16 and 20 and any SOAs). The waveguide photodetectors 16 and 20 can each have a length of, for example, 30-70 µm; and can be straight (e.g. when the photodetectors 16 and 20 have the same width as the passive waveguides 24) or can be tapered at one or both ends thereof (e.g. when the photodetectors 16 and 20 have a width that is larger than the width of the passive waveguides 20 and 28). The electroabsorption modulators 14 and 18 can have a length of, for example, 100-300 µm.

Figure 4E:
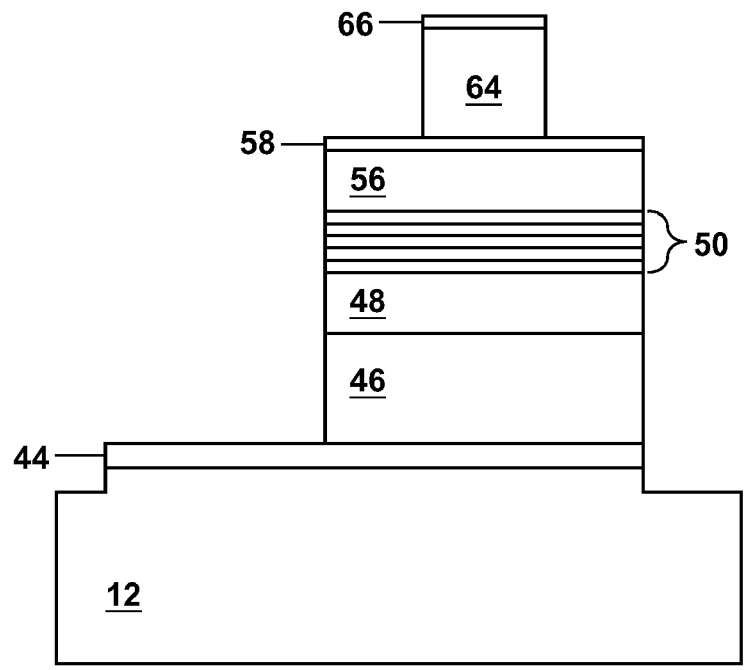

In FIG. 4E, one or more additional etching steps can be used to etch down to the InGaAs lower contact layer 44 and partway into the semi-insulating InP substrate 12.

Figure 4F:
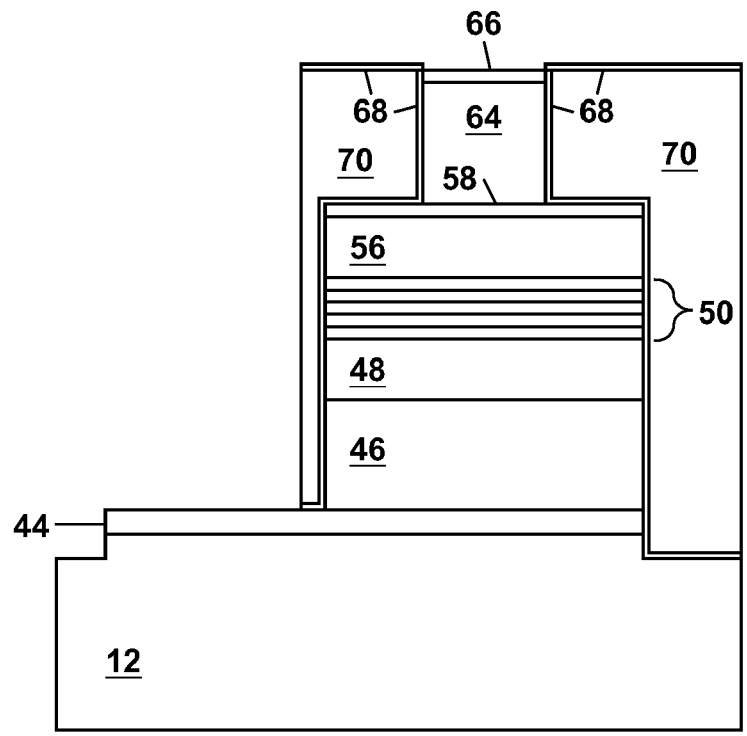

In FIG. 4F, layers of silicon nitride 68 and benzocyclobutene (BCB) 70 can then be deposited over the substrate 12 about the photodetectors 16 and 20, the modulators 14 and 18 and the laser 22, with openings at the locations where the upper and lower electrodes will be formed. The BCB 70 can be optionally tapered to allow the resistors 36 and 36' to be formed directly over the silicon nitride layer 68 on the InP substrate 12. This is useful for heat sinking of the resistors 36 and 36' to the InP substrate 12. The silicon nitride layers 68 can each be about 0.1-0.2 µm thick.

Figure 4G:
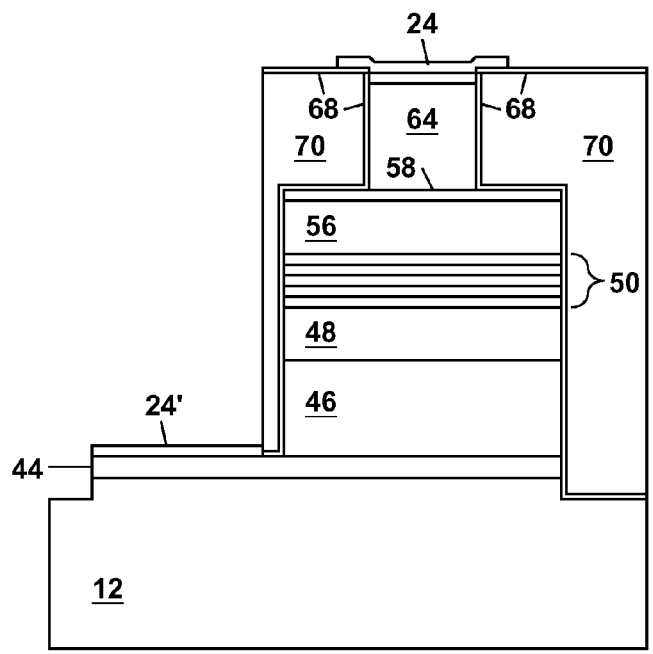
Figure 4H:
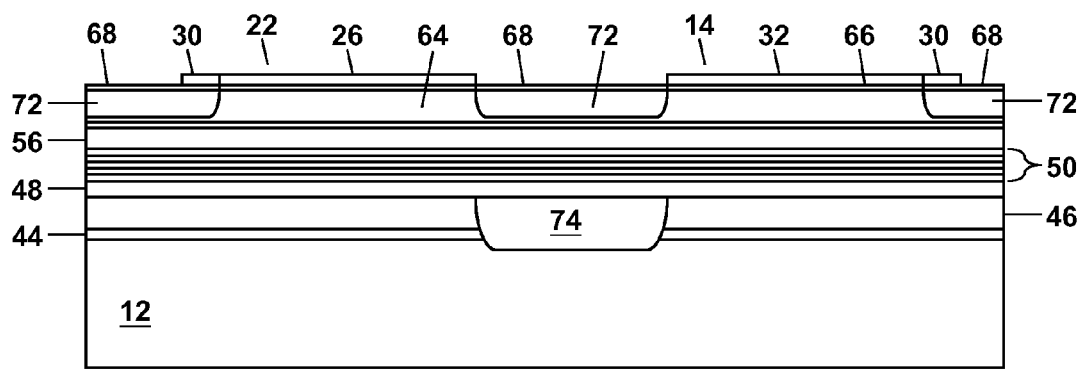

In FIG. 4G, the lower and upper electrodes can be deposited. The lower electrodes 26', 32', 34', 40' and 42' can comprise, for example, a gold/germanium/nickel/gold (Au/Ge/Ni/Au) metallization with an overall thickness of about 0.5 µm; and the upper electrodes 26, 32, 34, 40, 42 and the wiring 30 can be formed from a titanium/platinum/gold (Ti/Pt/Au) metallization with an overall thickness of about 1 µm. The resistors 36 and 36' can be deposited as thin-film metal resistors (e.g. comprising tantalum nitride or nichrome) with a resistance of, for example, 25-50 Ohms.

Adjacent elements of the optical NOR gate 10, which are not optically connected, can be electrically isolated by etching down partway into the semi-insulating InP substrate 12 as shown in FIG. 4G. However, this does not electrically isolate adjacent elements of the optical NOR gate 10 which must be optically connected via one of the passive waveguides 24. For these elements including the first electroabsorption modulator 14 which is optically connected to the laser 22 and to the second electroabsorption modulator 18, the III-V compound semiconductor layers in a passive waveguide region between these optically-connected elements can be ion implanted. Hydrogen ions can be implanted at an energy of about 200 keV to electrically isolate regions 72 of the p-type-doped III-V compound semiconductor layers; and helium ions can be implanted at an energy of about 2 MeV to electrically isolate regions 74 of the n-type-doped III-V compound semiconductor layers, with the helium-implanted regions 74 extending down partway into the InP substrate 12. The hydrogen-implanted regions 72 can also extend around the electrically-active elements 14, 16, 18, 20 and 22 as shown in FIG. 4H to improve the electrical characteristics of these elements. The helium-implanted regions 74 are located where the n-type-doped III-V compound semiconductor layers extend between the laser 22 and the first electroabsorption modulator 14, and also between the first electroabsorption modulator 14 and the second electroabsorption modulator 18 in the completed device 10. The ion implantation steps can be performed with suitable masking to protect the electrically-active elements after epitaxial growth of the InP layer 64 and the InGaAs cap layer 66 as previously described with reference to FIG. 4C. FIG. 4H shows a schematic cross-section view along the section line 2-2 in FIG. 1 to illustrate the locations of hydrogen-implanted regions 72 and helium-implanted regions 74 in the completed device 10.

Figure 5:
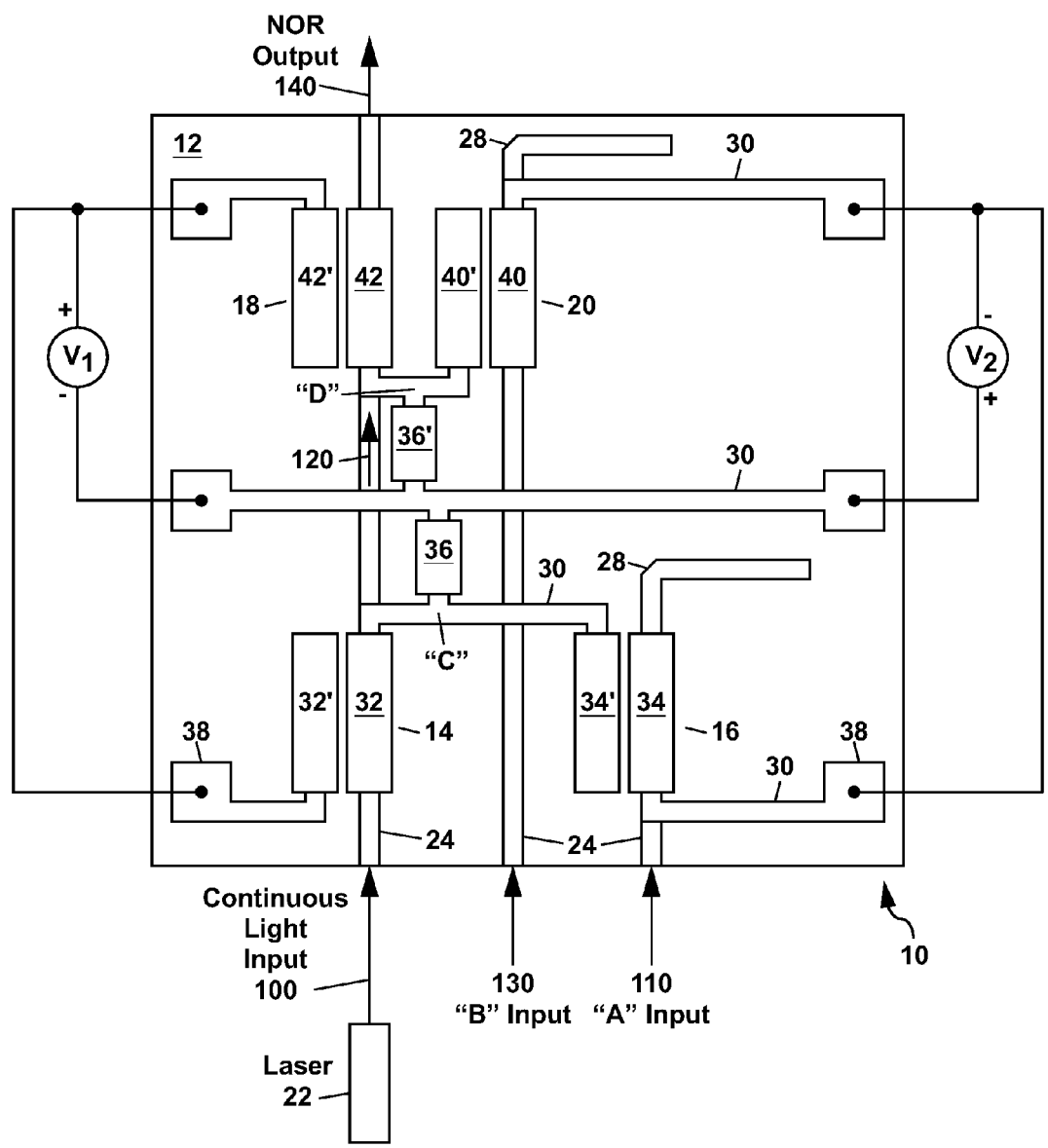
FIG. 5 shows a schematic plan view of a second example of the optical NOR gate of the present invention with the continuous light input being provided from an external laser.

FIG. 5 shows a schematic plan view of a second example of the optical NOR gate 10 of the present invention. This second example of the present invention can be formed in a manner similar to that previously described for the first example of the optical NOR gate 10 with reference to FIGS. 4A-4H except that there is no laser 22 on the substrate 12. The laser 22 can be located off the substrate 12 as shown in FIG. 5 with the continuous light 100 being coupled from the laser 22 into a passive waveguide 24 on the substrate 12 using free-space or optical fiber coupling. This second example of the optical NOR gate 10 of the present invention operates similar to the first example of FIGS. 1 and 2 to provide a NOR function output 140 as described previously.

Figure 6:
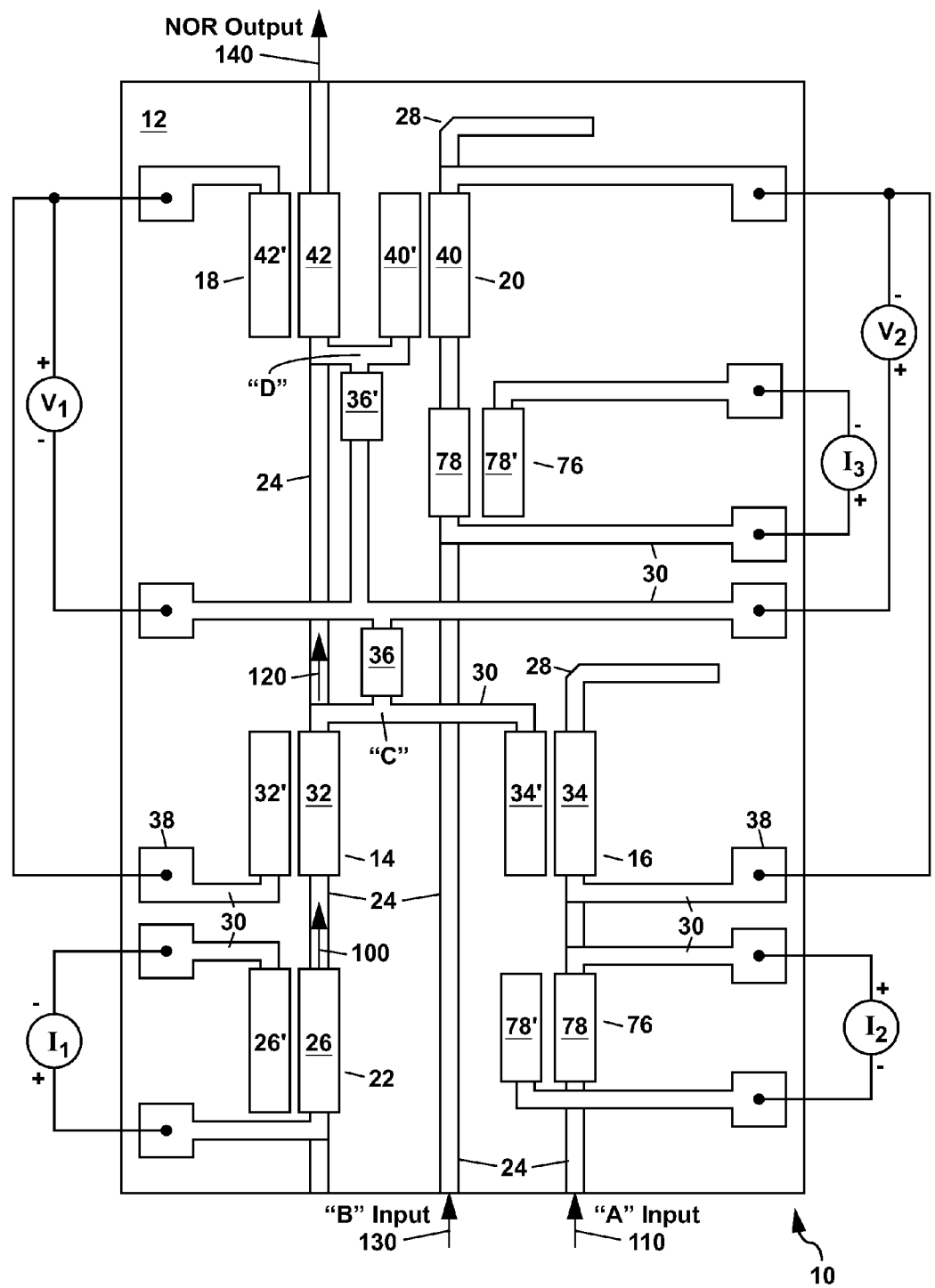
FIG. 6 shows a schematic plan view of a third example of the optical NOR gate of the present invention.
Figure 7:
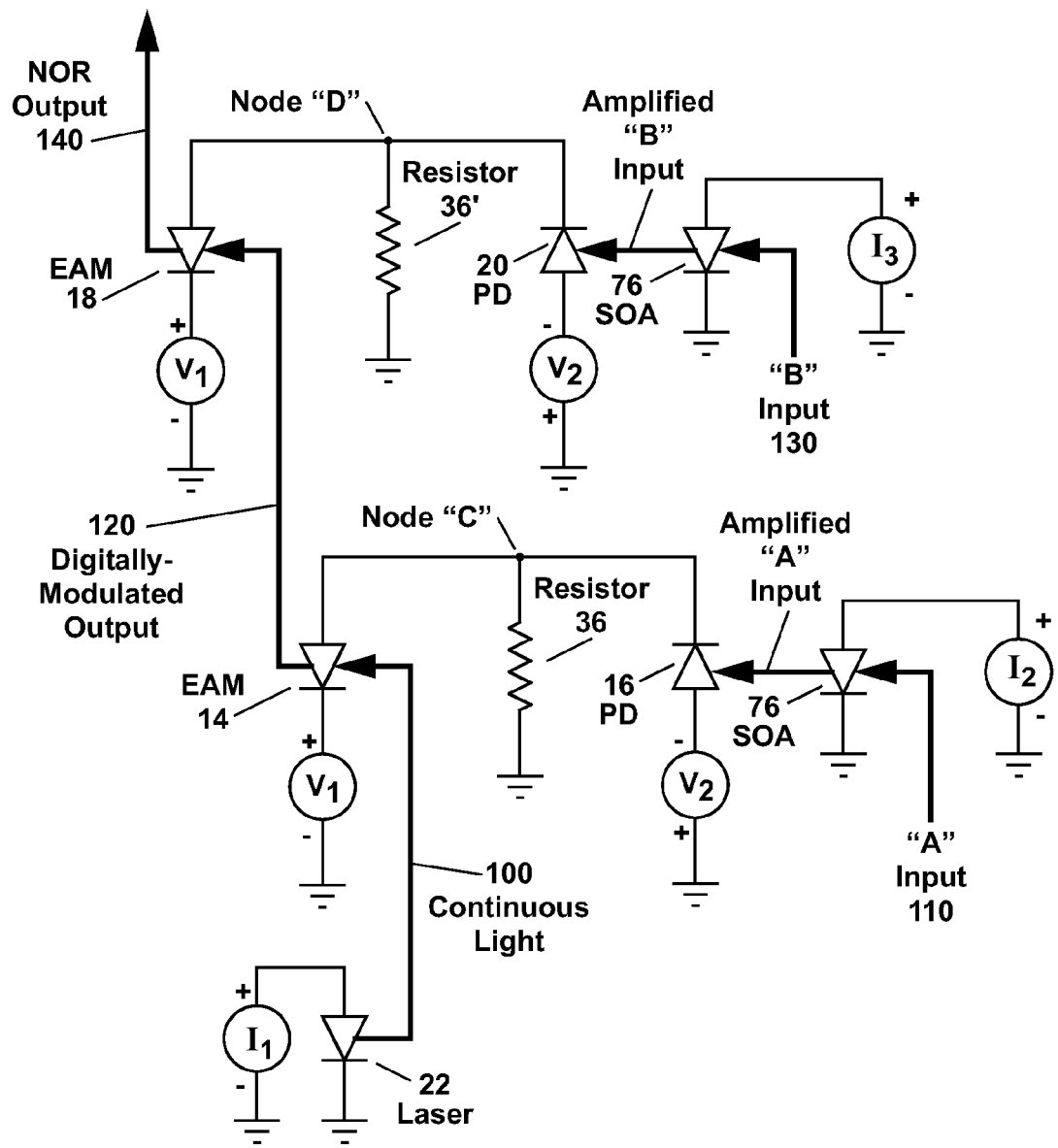
FIG. 7 shows a schematic diagram of the electrical and optical circuit for the optical NOR gate of FIG. 6.

FIG. 6 shows a schematic plan view of a third example of the optical NOR gate 10 of the present invention which operates similar to the first example of FIGS. 1 and 2 to provide a NOR function output 140. FIG. 7 shows a schematic diagram of the electrical and optical circuit for the optical NOR gate of FIG. 6.

In this third example of the present invention, a pair of semiconductor optical amplifiers (SOAs) 76 are provided on the substrate 12 to amplify the "A" input 110 and the "B" input 130 prior to detection by the first and second waveguide photodetectors 16 and 20, respectively. This is useful to provide an increased optical power (e.g. up to a few tens of milliWatts) for the amplified "A" and "B" inputs, which will provide larger photocurrent signals from the photodetectors 16 and 20, and thereby provide a larger on/off contrast for the digitally-modulated output 120 from the first electroabsorption modulator 14 and for the NOR output 140 from the second electroabsorption modulator 18. The provision of the SOAs 76 in the optical NOR gate 10 of FIG. 6 is also useful to reduce the amount of optical power needed for the continuous light 110 from the laser 22. If needed, another SOA 76 can be located between the laser 22 and the first electroabsorption modulator 14 to amplify the continuous light 100 which is input to the modulator 14. Additional SOAs 76 can be provided on the substrate 12 to amplify the digitally-modulated output 120 from the first electroabsorption modulator 14, or the NOR function output 140, or both.

Each SOA 76 can be formed using a gain region similar to the gain region in the laser 22 with an upper electrode 78 and a lower electrode 78'. The gain region for each SOA 76 can have a length of, for example, 100-500 µm, and a width of, for example, 1-10 µm. Alternatively, each SOA 76 can be formed as flared SOA 76 with a width that increases along the length of the SOA 76, or with an offset multi-quantum-well (MQW) gain region. The use of a flared SOA 76 or an SOA 76 having an offset MQW gain region is useful to provide a higher saturation power level for the SOA 76. The SOAs 76 in the example of FIG. 6 can be fabricated using the process steps previously described with reference to FIGS. 4A-4H.

In the example of FIG. 6, the laser 22 can be driven by a first current source $I_1$; and the SOAs 76 can be driven by additional current sources $I_2$ and $I_3$ as shown in FIG. 6. Each current source forward biases the gain region to generate optical gain therein. Each SOA 76 can provide a relatively high amplification to amplify an optical input signal to up to a few tens of milliWatts (e.g. 40 mW) of peak optical power.

In the absence of any light input into the first waveguide photodetector 16 due to the "A" input 110 being in a logical "0" state, no photocurrent signal will be generated from the photodetector 16 so that node "C" where the photodetector 16, modulator 14 and resistor 36 are all connected together will be at about ground electrical potential and substantially the entire reverse-bias voltage $V_1$ (e.g. −1 Volt) will be dropped across the first electroabsorption modulator 14. Since $V_1$ is relatively small, the absorption of the continuous light input 100 in the first electroabsorption modulator 14 will be relatively small with substantially all of the continuous light input 100 being transmitted through the modulator 14 so that the digitally-modulated output 120 from the first electroabsorption modulator 14 will be relatively large corresponding to the logical "1" state.

Conversely, when the "A" input 110 is in a logical "1" state, the "A" input 110 will be amplified by the SOA 76 prior to being detected by the first waveguide photodetector 16. This will produce a relatively large photocurrent in the first waveguide photodetector 16 when the amplified "A" input 110 is detected, with this photocurrent flowing through the resistor 36 to ground. Since the reverse-bias voltage $V_2$ (e.g. −5 Volts) is generally larger than $V_1$, the photocurrent signal generated by the photodetector 16 will produce a large change in the electrical potential at node "C" which will add to $V_1$, thereby substantially increasing the overall reverse-bias voltage which is dropped across the first electroabsorption modulator 14. This will greatly increase the absorption of the continuous light 100 within the modulator 14 so that the continuous light 100 will be substantially all absorbed therein to provide a very low light level for the digitally-modulated output 120 corresponding to the logical "0" state.

When the digitally-modulated output 120 reaches the second electroabsorption modulator 18, the absorption of the digitally-modulated output 120 therein will again depend upon the photocurrent generated by the second waveguide photodetector 20. With the modulator 18 and photodetector 20 connected in series as shown in FIG. 6, the reverse-bias voltage which is dropped across the second electroabsorption modulator 18 will be small when the "B" input 130 is in the logical "0" state so that the NOR output 140 will be in the logical "0" state when the digitally-modulated output 120 is in the logical "0" state, and will be in the logical "1" state when the digitally-modulated output 120 is in the logical "1" state.

When the "B" input 130 is in the logical "1" state, the input 130 will be amplified by the SOA 76 so that a relatively large photocurrent will be generated in the second waveguide photodetector 20. This will increase the reverse-bias voltage across the second electroabsorption modulator 14 thereby greatly increasing the absorption of the digitally-modulated output 120 therein to provide a logical "0" state for the NOR output 140 regardless of the logic state of the digitally-modulated output 120 which is input into the second electroabsorption modulator 18.

Those skilled in the art will understand that the optical NOR gate 10 of the present invention is a base logic gate that can be used to implement any other logic function. The optical NOR gate 10 of the present invention can be used alone to digitally process optical information, or as a building block to form an optical logic circuit, an optical signal processor, an optical computer, etc. A plurality of optical NOR gates 10 can be formed on a common substrate 12 and optically connected with passive waveguides 24 to other types of optical logic gates such as the optical NAND gates described in U.S. patent application Ser. No. 12/182,683, which is incorporated herein by reference, in a way analogous to the interconnection of a plurality of transistors to form an integrated circuit. Thus, for example, to form an optical signal processor or optical computer, the NOR outputs 140 from a plurality of optical NOR gates 10 would be used to provide the "A" and "B" inputs for other devices of the same or different type to provide a higher level of complexity as needed for the optical signal processor or optical computer.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A photonic integrated circuit which generates a NOR function digital optical output from a pair of digital optical inputs, comprising:

a first pair of optical waveguide devices formed on a substrate, with the first pair of optical waveguide devices comprising a first electroabsorption modulator which is electrically connected in series with a first photodetector, with the first electroabsorption modulator receiving an input of continuous light, and with the first photodetector receiving a first digital optical input of the pair of digital optical inputs to generate therefrom a photocurrent signal which changes a reverse-bias voltage on the first electroabsorption modulator to generate a digitally-modulated output from the input of continuous light; and a second pair of optical waveguide devices formed on the substrate, with the second pair of optical waveguide devices comprising a second electroabsorption modulator which is electrically connected in series with a second photodetector, with the second electroabsorption modulator receiving the digitally-modulated output from the first electroabsorption modulator, and with the second photodetector receiving a second digital optical input of the pair of digital optical inputs to generate therefrom another photocurrent signal which changes the reverse bias voltage on the second electroabsorption modulator to convert the digitally-modulated output into the NOR function digital optical output.

2. The apparatus of claim 1 wherein the input of continuous light is provided by a laser.

3. The apparatus of claim 2 wherein the laser is located on the substrate.

4. The apparatus of claim 2 wherein the laser comprises a distributed-Bragg reflector (DBR) laser.

5. The apparatus of claim 1 further comprising a plurality of optical waveguides on the substrate to guide the input of continuous light to the first electroabsorption modulator, to guide the first digital optical input to the first photodetector, to guide the digitally-modulated output from the first electroabsorption modulator to the second electroabsorption modulator, to guide the second digital optical input to the second photodetector, and to guide the NOR function digital optical output from the second electroabsorption modulator.

6. The apparatus of claim 1 wherein the substrate comprises a III-V compound semiconductor substrate, and each electroabsorption modulator and each photodetector comprises a plurality of III-V compound semiconductor layers which are epitaxially grown on the III-V compound semiconductor substrate.

7. The apparatus of claim 6 wherein the III-V compound semiconductor substrate comprises indium phosphide (InP), and the plurality of III-V compound semiconductor layers are selected from the group consisting of indium gallium arsenide phosphide (InGaAsP) layers, indium gallium arsenide (InGaAs) layers, indium aluminum gallium arsenide (InAlGaAs) layers, and combinations thereof.

8. The apparatus of claim 6 wherein the III-V compound semiconductor substrate comprises gallium arsenide (GaAs), and the plurality of III-V compound semiconductor layers are selected from the group consisting of GaAs layers, aluminum gallium arsenide (AlGaAs) layers, indium gallium arsenide phosphide (InGaAsP) layers, indium gallium arsenide (InGaAs) layers, and combinations thereof.

9. The apparatus of claim 1 wherein the first digital optical input and the second digital optical input have a wavelength in the range of 0.8-2.0 microns.

10. The apparatus of claim 1 wherein the input of continuous light has a wavelength in the range of 0.8-2.0 microns.

11. The apparatus of claim 1 further comprising at least one semiconductor optical amplifier formed on the substrate to amplify an optical signal selected from the group consisting of the input of continuous light, the first digital optical input, the second digital optical input, the digitally-modulated output, and the NOR function digital optical output.

12. An optical NOR gate which receives a first digital optical input and a second digital optical input and generates therefrom a NOR function digital optical output, comprising:
a III-V compound semiconductor substrate having a plurality of III-V compound semiconductor layers epitaxially grown thereon;
a laser formed from the plurality of III-V compound semiconductor layers to provide a source of continuous light;
a first electroabsorption modulator formed from the plurality of III-V compound semiconductor layers, with the first electroabsorption modulator receiving the continuous light from the laser;
a first waveguide photodetector formed from the plurality of III-V compound semiconductor layers to receive the first digital optical input and to generate therefrom a first photocurrent signal which changes an absorption of light in the first electroabsorption modulator, thereby modulating the continuous light transmitted through the first electroabsorption modulator to provide a digitally-modulated output from the first electroabsorption modulator;
a second electroabsorption modulator formed from the plurality of III-V compound semiconductor layers, with the second electroabsorption modulator receiving the digitally-modulated output from the first electroabsorption modulator; and
a second waveguide photodetector formed from the plurality of III-V compound semiconductor layers to receive the second digital optical input and to generate therefrom a second photocurrent signal which changes the absorption of light in the second electroabsorption modulator, thereby converting the digitally-modulated output being transmitted through the second electroabsorption modulator into the NOR function digital optical output.

13. The apparatus of claim 12 wherein the III-V compound semiconductor substrate comprises indium phosphide (InP), and the plurality of III-V compound semiconductor layers are selected from the group consisting of indium gallium arsenide phosphide (InGaAsP) layers, indium gallium arsenide (InGaAs) layers, indium aluminum gallium arsenide (InAlGaAs) layers, and combinations thereof.

14. The apparatus of claim 12 wherein the III-V compound semiconductor substrate comprises gallium arsenide (GaAs), and the plurality of III-V compound semiconductor layers are selected from the group consisting of GaAs layers, aluminum gallium arsenide (AlGaAs) layers, indium gallium arsenide phosphide (InGaAsP) layers, indium gallium arsenide (InGaAs) layers, and combinations thereof.

15. The apparatus of claim 12 wherein the first electroabsorption modulator and the first waveguide photodetector are electrically connected in series, and the second electroabsorption modulator and the second waveguide photodetector are electrically connected in series.

16. The apparatus of claim 12 wherein the laser comprises a distributed Bragg reflector (DBR) laser.

17. The apparatus of claim 12 wherein a plurality of passive optical waveguides are provided on the substrate and formed from the plurality of III-V compound semiconductor layers to guide continuous light from the laser to the first electroabsorption modulator, to guide the first digital optical input to the first waveguide photodetector, to guide the second digital optical input to the second waveguide photodetector, to guide the digitally-modulated output from the first electroabsorption modulator to the second electroabsorption modulator, and to guide the NOR function digital optical output from the second electroabsorption modulator.

18. The apparatus of claim 12 wherein the first digital optical input and the second digital optical input have a wavelength in the range of 0.8-2.0 microns.

19. The apparatus of claim 12 wherein the continuous light from the laser has a wavelength in the range of 0.8-2.0 microns.

20. The apparatus of claim 12 further comprising at least one semiconductor optical amplifier formed on the III-V compound semiconductor substrate from the plurality of III-V compound semiconductor layers to amplify an optical signal selected from the group consisting of the continuous light from the laser, the first digital optical input, the second digital optical input, the digitally-modulated output from the first electroabsorption modulator, and the NOR function digital optical output.

* * * * *